United States Patent [19]
Kavick

[11] 4,111,469
[45] Sep. 5, 1978

[54] HYDRAULIC HOSE AND COUPLING ASSEMBLY

[75] Inventor: Edward M. Kavick, Chardon, Ohio

[73] Assignee: Samuel Moore and Company, Aurora, Ohio

[21] Appl. No.: 753,896

[22] Filed: Dec. 23, 1976

[51] Int. Cl.² ............................................. F16L 33/20
[52] U.S. Cl. ................................... 285/256; 285/259
[58] Field of Search ............... 285/174, 149, 256, 259, 285/246, 243, 257

[56] References Cited

U.S. PATENT DOCUMENTS

| | | |
|---|---|---|
| 2,273,398 | 2/1942 | Couty et al. ................. 285/256 X |
| 2,314,000 | 3/1943 | Lusher et al. ................ 285/259 X |
| 2,371,971 | 3/1945 | Moin et al. .................... 285/259 |
| 3,257,132 | 6/1966 | Lyons ............................ 285/259 X |
| 3,610,665 | 10/1971 | Mingo ............................ 285/256 |
| 3,838,592 | 10/1974 | Goward et al. ............... 285/256 X |

FOREIGN PATENT DOCUMENTS

| | | | |
|---|---|---|---|
| 1,495,499 | 8/1967 | France ................................... 285/256 |
| 2,250,399 | 4/1973 | Fed. Rep. of Germany .......... 285/256 |
| 759,998 | 10/1956 | United Kingdom .................... 285/259 |

Primary Examiner—Dave W. Arola
Attorney, Agent, or Firm—Clelle W. Upchurch

[57] ABSTRACT

A hydraulic hose having a core tube, a layer of reinforcing material disposed about the core tube and a protective sheath about the reinforcing material is provided with a coupling member on one end thereof having a nipple inserted in the core tube and a shell disposed about the sheath of the hose. The shell has a plurality of circumferentially spaced integral solid three-dimensional barbs piercing the sheath and embedded in the reinforcing material. The barbs are preferably either conical or pyramidal and have a pointed apex in order that they can pierce the reinforcing material when the coupling member is installed on the end of the hose by insertion between fibers without cutting or tearing the reinforcing material.

10 Claims, 7 Drawing Figures

HYDRAULIC HOSE AND COUPLING ASSEMBLY

This invention relates generally to hydraulic hose and more particularly to a coupling member to be installed on the end of a hose and an assembly of a hydraulic hose and a coupling member.

Hydraulic hose is connected for fluid transfer to a source of fluid under pressure or to the end of another length of hose by means of a coupling member. The coupling member may be threaded or provided with other means for connection to the other coupling member. It is essential that the coupling member be installed on the end of the hose so securely that it will not become detached in service even when the hose is conducting fluids at high pressures. The usual practice for attaching the coupling member to the end of the hose has been to provide a fitting having a nipple or stem portion adapted to be inserted into the bore of the hose and a substantially concentric shell adapted to surround the sheath of the hose. After the coupling member has been installed loosely on the end of the hose it is placed in a swaging apparatus which reduces the diameter of the coupling member and compresses the hose wall between the nipple and shell.

The heretofore available hose and coupling member assemblies have not been entirely satisfactory for operating at high fluid pressures so it has been proposed heretofore to provide an insert member between the shell and the hose to fasten more securely the coupling member to the end of the hose. For example, the hose disclosed in U.S. Pat. No. 3,457,359 issued July 22, 1969, is provided with a flat element having one or more sharp prongs embedded in the wall of the hose. Also, in accordance with the disclosure in U.S. Pat. No. 2,314,000, a segmented insert member having barbs is provided between the nipple and shell. The insert member has one end disposed against ridges on the nipple and the barbed members are disposed on the external surface of the hose with their barbs embedded in the hose wall. A hose having a somewhat similar insert member underlying the shell of the coupling member is disclosed in Swiss Patent No. 101,231 published Sept. 15, 1923. Still other types of barbed insert members installed between the external surface of the hose and the shell of the coupling member have been proposed but they all have the same disadvantage of requiring the manufacture and assembly of an additional part for the coupling and they all present a problem of fastening the shell about the slick surfaced insert member so securely that the coupling is not blown from the end of the hose when the hose is operating under a high fluid pressure.

It is therefore an object of this invention to provide an improved coupling member to be secured to the end of a hydraulic hose. Another object of the invention is to provide an assembly of a hydraulic hose end and a coupling member adapted to be used at high pressures without separation of the coupling member from the hose. Still another object of the invention is to provide an assembly for a hydraulic hose and coupling member having an improved structure for securing the coupling member to the end of the hose. A more specific object of the invention is to provide a coupling member with a shell having a means for securing the fitting to the end of a hydraulic hose which adapts operation of the hose at high pressures.

Other objects will become apparent from the following description with reference to the accompanying drawing in which.

The foregoing objects and others are accomplished in accordance with this invention generally speaking by providing a coupling member having a shell secured to a body portion having a nipple or stem, the shell being provided on its inner wall with a plurality of circumferentially spaced barbs having a pointed apex and of sufficient length to extend through the sheath of a hydraulic hose and become embedded between strands of a reinforcing material disposed about the core tube of the hose. In a preferred embodiment of the invention the shell of the coupling member is provided with a means for relieving compression of the hose near the mouth of the shell to avoid bulging of the hose. This means for relieving compression preferably includes one or more annular grooves in the internal wall of the shell which are spaced longitudinally from the open end of the shell after it has been installed on the body of the coupling member.

The invention also contemplates an assembly of the novel coupling member with a hydraulic hose in which a plurality of barbs circumferentially spaced in one or more rows about the inner wall of the shell and integral therewith pierce the sheath of a hydraulic hose and are embedded between strands of a reinforcing material about the core tube of the hose.

One method of making the coupling shell may be, for example, where an aluminum or other metallic tube is prepared by extrusion and has a plurality of longitudinally extending circumferentially spaced ribs which are triangular in cross-section. A length of tubing conforming substantially to the desired length of the shell is cut from the extruded tube, the tubing is held in a chuck, a forming tool is inserted in the length of tubing and the ribs are cut away to form pyramidally shaped barbs on the inner wall of the tubing. This method is described in application Ser. No. 753,897 filed Dec. 23, 1976. Alternately, the tube may be provided with internally projecting rings which are triangular in cross-section and barbs formed therefrom with a broaching tool pulled longitudinally through the tube. The shell may also be made by casting a suitable synthetic resin such as nylon or the like or a metal such as aluminum, an aluminum alloy, brass, copper, steel or the like with the barbs cast on the inner wall thereof.

Figure 1:
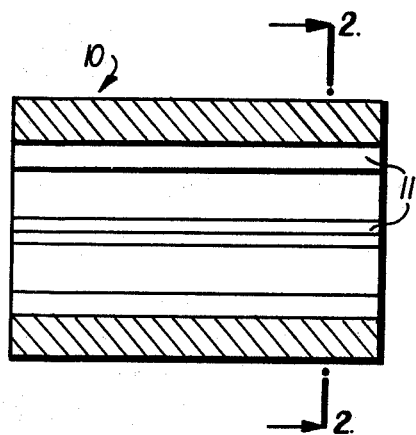
FIG. 1 is a longitudinal section of a length of an extruded tube adapted to be fabricated into the shell of the coupling member provided by the invention.
Figure 2:
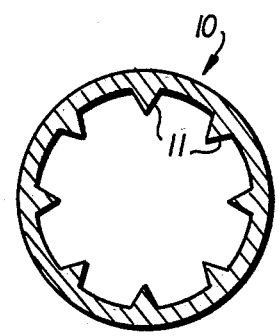
FIG. 2 is a cross-section along the line II—II of FIG. 1.

Referring now to the drawing, a preferred embodiment of the shell of the coupling member of the invention is illustrated in various stages of its fabrication and installed on an end of a hose. An extruded aluminum tubular member 10 having circumferentially spaced longitudinally extending ribs 11 is illustrated in FIG. 1. Ribs 10, as shown in FIG. 2, are triangularly shaped in cross-section.

Figure 3:
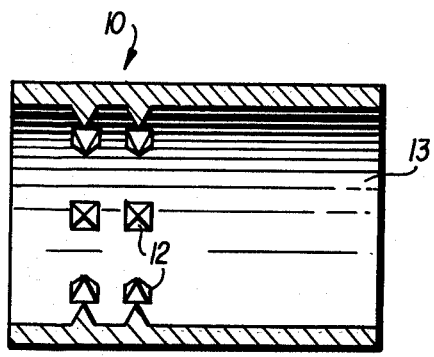
FIG. 3 illustrates the tube of FIG. 1 after a machining operation to complete the fabrication of a barb on the inner wall.

The tube 10 is rotated against a forming tool inserted therein to remove portions of ribs 11 by machining to form pyramidal shaped solid barbs 12 integral with inner wall 13 of tube 10. Barbs 12 in the illustrated embodiment (FIG. 3) are circumferentially spaced on the inside wall 13 in two longitudinally spaced rows. In this particular embodiment there are 10 barbs 12 per row but more or less barbs per row and only one row or more than two rows may be provided in other embodiments of the invention depending upon the size of the hose and the pressure to which the hose-coupling member assembly may be exposed.

Figure 4:
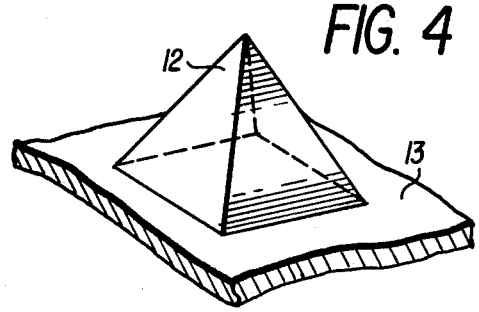
FIG. 4 is an enlarged view of an embodiment of one of the barbs on the inner wall of the tube illustrated in FIG. 3.
Figure 5:
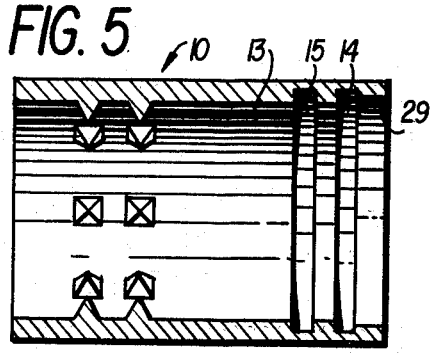
FIG. 5 illustrates the tubular member of FIG. 3 after a subsequent machining operation.

A pair of longitudinally spaced internal grooves 14 and 15 are cut into the wall of tube 10 near one end thereof as illustrated in FIG. 5 and spaced longitudinally from pyramidal shaped barbs 12 which are shown in perspective in FIG. 4. Also illustrated in FIG. 5 is relieved inner wall 29 at the end of tube 10 having an internal diameter larger than that of internal wall 13 of tube 10.

Figure 6:
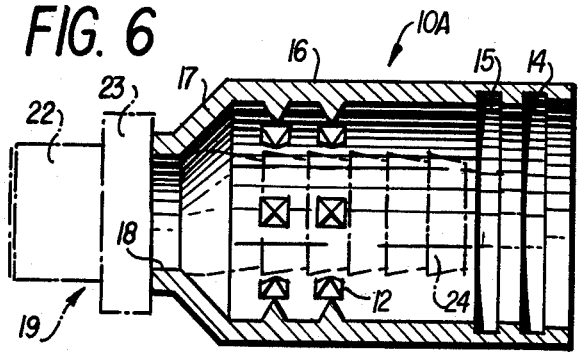
FIG. 6 illustrates the assembly of the shell member of FIG. 5 with the stem portion and body portion of one embodiment of the coupling member of the invention.

The tube 10 is shaped into a shell 10A having a cylindrical portion 16 and a frusto-conical portion 17. As illustrated in FIG. 6, the open end of frusto-conically shaped portion 17 is secured to body member 19 such as, for example, by crimping in a groove 18 on nipple or stem 24 of body member 19 to secure shell 10A to body member 19 to complete the coupling member. The resulting coupling member has a tubular body member 19 provided with an externally threaded section 22, a hexagonal raised nut 23 and a nipple or stem 24. Annular groove 18 is cut in stem 24 adjacent to the side of nut 23.

Figure 7:
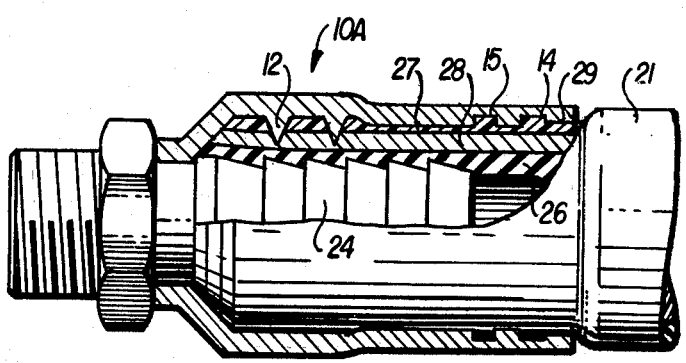
FIG. 7 illustrates the coupling member of FIG. 6 installed on the end of a hydraulic hose.

A hydraulic hose 21 secured to the coupling member is illustrated in FIG. 7. The end of hose 21 is inserted loosely in the coupling member with stem 24 in the bore of core tube 26 of the hose. The assembly of hose end 21 and coupling member is placed in a suitable swaging die and shell 10A is reduced in cross-section to force barbs 12 through the sheath 27 of hose 21 until the pointed ends thereof are embedded in the reinforcing layer 28.

As shell 10A is compressed about the hose end 21, sheath 27 flows into grooves 14 and 15 and against relieved inner wall 29. Synthetic resinous sheaths will cold flow as the hose end is compressed and the spaces provided by grooves 14 and 15 and relieved inner wall 29 accommodate sufficient sheath material to avoid bulging of sheath 27 outside the end of shell 10A.

Shell 10A is preferably formed from an extruded aluminum tube as described above, but it may be any other suitable metal such as an aluminum alloy, steel, brass or the like.

The internal barbs are preferably formed by cutting away portions of the internal ribs as described above but as suggested hereinbefore other methods may be used. For example, a tube having a smooth internal wall surface may be extruded from suitable metal or synthetic polymer. Annular grooves may then be cut therein to provide two sides of the barbs, and a broaching tool may then be pulled through the tube to cut longitudinal grooves and shape the other sides of the barbs. The barbs may be formed by piercing the shell but this is one of the less preferred methods because of the external appearance of the pierced shell. The shell may also be cast with the barbs shaped to the desired configuration but such a process is less attractive than an extrusion plus machining process for forming the barbs.

Best results are obtained particularly in high pressure hose assemblies if the barbs are solid three-dimensional protuberances such as conical or pyramidal shaped protuberances. The barbs must have a pointed apex for penetration of the fibrous layer without substantial cutting thereof. While a triangularly shaped protuberance may be used in some hose assemblies, the three-dimensional barbs such as conical or pyramidal shaped barbs are stronger than a triangular shaped one and are preferred. By three "dimensional barbs" as used herein is meant protuberances having a base which has substantial dimensions both longitudinally and circumferentially as distinguished from triangularly shaped barbs pierced from the shell which extend longitudinally in thickness only a distance equal to the thickness of the shell. Preferably, the "three-dimensional barbs" have rectangular bases or circular bases and taper gradually to a pointed apex. The bases of the barbs are not necessarily symmetrical but they are preferably substantially symmetrical.

Best results have been obtained so far with an aluminum coupling member but in its broader aspects the invention contemplates synthetic polymer coupling members such as nylon, polyethylene, polyurethane or the like.

The coupling member provided by the invention may be secured to the end of any suitable hydraulic hose such as one having a rubber or synthetic rubber sheath and/or core tube and metallic and/or fiberous reinforcement but it is particularly advantageous for hoses having synthetic polymer components such as, for example, the hoses described in U.S. Pat. Nos. 3,062,241; 3,116,760; 3,604,461; 3,722,550 and 3,905,398, the disclosures of which are incorporated herein by reference. As disclosed in the patents, the core tube may be an extruded nylon, polyurethane or other synthetic polymer. The core tube reinforcing layer may be a fibrous material such as braided, helically wound, knitted or the like nylon, polyethylene-terephthalate ester, aromatic polyamide or the like fiber. The sheath may be nylon, polyethylene, polyurethane or the like.

The coupling member may have suitable means for connecting it to another coupling member such as female or male threads or a snap-lock arrangement. The novel shell may, for example, be combined with the body and stem of the coupling member disclosed in U.S. Pat. No. 3,165,338. The coupling member may be fastened to the end of a hose with any suitable apparatus such as, for example, one of the devices disclosed in U.S. Pat. Nos. 3,058,212; 3,706,123; 3,849,858; 3,785,050; and 3,858,298.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A hydraulic hose comprising a core tube, a layer of reinforcing material disposed about the core tube and a protective sheath about the reinforcing material and on at least one end thereof a permanently attached coupling member comprising a body portion having means for connecting the coupling member to a source of fluid at one end thereof and a nipple extending from an opposite end thereof inserted in the core tube, an external annular member disposed between the connecting means end and the nipple, an external annular groove disposed adjacent the annular member on the side thereof facing the nipple, a shell disposed substantially concentrically about the nipple having an inner wall thereof disposed about the sheath of the hose and having one end thereof embedded in said external annular groove to permanently secure the shell to the body portion, said shell having a plurality of circumferentially spaced three-dimensional barbs on its inner wall with a minimum dimension at the base thereof greater than the thickness of the shell wall at the barb location, said barbs piercing the sheath and embedded in the reinforcing material and said shell comprising the sole external means of attaching the coupling member to the hose.

2. The hose of claim 1 wherein the shell has compression relief means on its inner wall having an inner diameter thereof greater than the diameter of the shell inner wall at the base of the barbs and said barbs are disposed between the compression relief means and the said secured shell end.

3. The hose of claim 2 wherein the compression relief means comprises one or more annular grooves disposed in the inner wall of the shell between said barbs and the shell end opposite to the said secured end.

4. The hose of claim 2 wherein a relieved portion is provided in the inner wall of the shell between the said internal annular grooves and the shell end opposite to the said secured end.

5. The hose of claim 1 wherein the barbs are solid three-dimensional protuberances integral with the inner wall of the shell.

6. A coupling member for the end of a hydraulic hose having a sheath, core tube and intermediate reinforcement for the core tube, comprising a body portion having means for connecting the member to a source of fluid, a nipple extending from the body portion and adapted to be inserted in the bore of the hose, an external annular member disposed between said body portion connecting means and said nipple, an annular external groove in the body portion adjacent the said external annular member on the side thereof facing the nipple, and a shell having an inner wall substantially concentric with the nipple and spaced radially therefrom, said shell having one end embedded in said external annular groove to permanently secure the shell to the body portion and having a plurality of three-dimensional barbs on the inner wall thereof with a minimum dimension at the base thereof greater than the thickness of the shell wall at the barb location projecting into the space between the shell and nipple a distance greater than the thickness of said sheath and said shell comprising the sole external means of attaching the coupling member to the hose.

7. The coupling member of claim 6 wherein the barbs are solid three-dimensional protuberances integral with the inner wall of the shell.

8. The coupling member of claim 6 wherein the shell has compression relief means on its inner wall having an inner diameter thereof greater than the diameter of the shell inner wall at the base of the barbs and said barbs are disposed between said compression relief means and said secured shell end.

9. The coupling member of claim 8 wherein the compression relief means comprises one or more annular grooves disposed in the inner wall of the shell between said barbs and the shell end opposite to the said secured end.

10. The coupling member of claim 9 wherein a relieved portion is provided in the inner wall of the shell between said internal annular grooves and the shell end opposite to the said secured end.

* * * * *